US012675425B2

(12) United States Patent
Leisenheimer

(10) Patent No.: US 12,675,425 B2
(45) Date of Patent: Jul. 7, 2026

(54) ELECTRONIC SYSTEM HAVING AN INTEGRATED MASTER CIRCUIT AND AN INTEGRATED SLAVE CIRCUIT

(71) Applicant: Infineon Technologies AG, Neubiberg (DE)

(72) Inventor: Stephan Leisenheimer, Oberhaching (DE)

(73) Assignee: Infineon Technologies AG, Neubiberg (DE)

( * ) Notice: Subject to any disclaimer, the term of this patent is extended or adjusted under 35 U.S.C. 154(b) by 35 days.

(21) Appl. No.: 18/974,946

(22) Filed: Dec. 10, 2024

(65) Prior Publication Data

US 2025/0190385 A1      Jun. 12, 2025

(30) Foreign Application Priority Data

Dec. 11, 2023   (DE) .......................... 102023212489.0

(51) Int. Cl.
*G06F 13/362* (2006.01)
(52) U.S. Cl.
CPC .................................. *G06F 13/362* (2013.01)
(58) Field of Classification Search
None
See application file for complete search history.

(56) References Cited

U.S. PATENT DOCUMENTS

| | | | | |
|---|---|---|---|---|
| 6,247,082 B1* | 6/2001 | Lo | ......................... | G06F 13/405 |
| | | | | 710/105 |
| 7,257,656 B1* | 8/2007 | Culca | .................. | G06F 13/4295 |
| | | | | 709/208 |
| 7,719,342 B2* | 5/2010 | Jeong | ............... | H03K 3/356139 |
| | | | | 365/96 |
| 8,246,462 B1* | 8/2012 | Tran | ........................ | G06F 3/014 |
| | | | | 463/31 |
| 10,572,439 B1* | 2/2020 | Graif | ................... | G06F 13/4291 |
| 2003/0088801 A1* | 5/2003 | Jain | ..................... | G06F 13/4226 |
| | | | | 713/400 |
| 2005/0174877 A1* | 8/2005 | Cho | ...................... | G06F 13/423 |
| | | | | 365/232 |

OTHER PUBLICATIONS

"I2C Master/Multi-Master/Slave," Cypress Semiconductor Corporation, San Jose, CA, Mar. 8, 2012, 48 pages.

* cited by examiner

*Primary Examiner* — Elias Mamo
(74) *Attorney, Agent, or Firm* — Harrity & Harrity, LLP

(57) ABSTRACT

The present disclosure relates to an electronic system including a master IC, a slave IC and a serial communication interface having a bidirectional data line and a clock line. The master IC is configured to send a data request command to the slave IC via the data line. The slave IC is configured to begin providing requested data in response to the data request command. The slave IC is configured to deactivate the clock line after receiving a data read command and until the slave IC can provide the requested data. The master IC is configured to measure a duration of the deactivation of the clock line and to set a wait time between a next data request command and a next data read command according to the measured duration.

20 Claims, 8 Drawing Sheets

ELECTRONIC SYSTEM HAVING AN INTEGRATED MASTER CIRCUIT AND AN INTEGRATED SLAVE CIRCUIT

CROSS-REFERENCE TO RELATED APPLICATION

This application claims priority to Germany Patent Application No. 102023212489.0 filed on Dec. 11, 2023, the content of which is incorporated by reference herein in its entirety.

TECHNICAL FIELD

The present disclosure deals with electronic systems comprising an integrated master circuit (Master IC) and a slave IC. A serial communication interface with a bidirectional data line and a clock line is configured to transfer data between the master IC and the slave IC. The serial communication interface can be an I²C (Inter-Integrated Circuit).

BACKGROUND

I²C refers to a serial data bus that has developed into a widely accepted industry standard. It can be used device-internally for communication between different circuit parts, e.g., within a television set or between a controller and peripheral ICs.

I²C is configured as a master-slave bus. A data transfer can be initiated by a master (controller); a slave (target) addressed via an address responds to this. Multiple controllers are possible (multi-controller operation). If in multi-controller operation a controller block is also working as a target, another controller can communicate directly with it by addressing it as a target.

A feature of I²C is that a microcontroller can control a whole network of integrated circuits with just two I/O pins and simple software. Buses of this type were realized because a significant part of the cost of an integrated circuit and a printed circuit board used depends on the size of the housing and the number of pins. A large IC housing has more pins, needs more space on the PCB, and has more connections that can fail. All of this increases production and test costs.

Although slower than more recent bus systems, because of the low overhead I²C can be beneficial for peripherals that do not need to be fast. I²C can be used for transmission of control and configuration data. Examples include volume controls, low-sampling-rate analog-to-digital or digital-to-analog converters, real-time clocks, small, non-volatile memories, or bidirectional switches and multiplexers. Electronic sensors can also have an integrated analog-to-digital converter with an I²C interface.

The use of I²C can result in conflicting requirements. For example, there may be a need for immediate readout of data (e.g., measurement data) if the data is available on the sensor side. There may be a need for a lower power consumption of the system. There may be a need for inexpensive I²C slave ICs without additional interrupt pins. There may also be a need for increased I²C bandwidth.

SUMMARY

One or more of the above requirements will be met by means and methods according to the independent claims. Advantageous developments are addressed by the dependent claims.

In accordance with a first aspect, an electronic system is proposed. The electronic system includes an integrated master circuit (Master IC) and a slave IC. The electronic system also includes a serial communication interface with a bidirectional data line and a clock line. The communication interface is configured to transfer data between the master IC and the slave IC. The master IC is configured to send a data request command to the slave IC via the data line. The slave IC is configured to begin providing requested data in response to the data request command. The master IC is configured to send a data read command for reading the requested data via the data line to the slave IC after the data request command. The slave IC is configured to deactivate the clock line after receiving the data read command until the slave IC can provide the requested data. The master IC is configured to measure a duration of the deactivation of the clock line. The master IC is configured to set a wait time between a next data request command and a next data read command according to the measured duration.

According to some example implementations, the master IC is configured to send the data read command to the slave IC after a specified minimum data provision time has elapsed since the data request command. The slave IC is configured, if the requested data is not yet completely available after the specified minimum data provision time, to deactivate the clock line until the slave IC can provide the requested data. The master IC is configured to measure the duration of the deactivation of the clock line and to set the wait time between the next data request command and the next data read command according to the minimum data provision time and the measured duration.

According to some example implementations, the master IC is configured to maintain the wait time for a plurality of next data request commands and next data read commands, and then to determine an updated wait time according to one of the described example implementations.

According to some example implementations, the master IC is configured to use the set wait time for a data request command and the subsequent data read command, and then to reduce the wait time between the data request command and the data read command gradually, until a renewed deactivation of the clock line is detected by the slave IC in order to be able to provide the requested data on the data line.

According to some example implementations, the master IC is configured to measure the duration of the renewed deactivation of the clock line and to set a renewed updated wait time between the next data provision command and the subsequent data read command according to the measured duration.

According to some example implementations, the Master IC includes a microcontroller.

According to some example implementations, the slave IC includes a sensor IC, such as a magnetic field sensor IC. The magnetic field sensor IC can include a 3D Hall sensor IC.

According to some example implementations, the serial communication interface includes an I²C communication interface.

According to a second aspect, a communication method is proposed for an electronic system including a master IC and a slave IC. The electronic system further includes a serial communication interface with a bidirectional data line and a clock line to transfer data between the master IC and the slave IC. The communication method includes sending a data request command from the master IC via the data line to the slave IC. The communication method includes the slave IC to begin providing requested data in response to the data request command. The communication method includes sending a data read command for reading the requested data from the master IC to the slave IC via the data line, after the data request command. The communication method includes deactivating the clock line by the slave IC after receiving the read data command until the slave IC can provide the requested data. The communication method includes measuring a duration of the deactivation of the clock line by the master IC. The communication method includes setting a wait time between a next data request command and a next data read command according to the measured time duration by the master IC.

An integrated circuit (IC) is proposed in accordance with another aspect. The IC includes a serial communication interface with a bidirectional data line and a clock line. The communication interface is configured to transfer data between the IC and an additional IC via the data line. The IC further includes a processor, which is configured to send a data request command to the additional IC via the data line, to send a data read command to the additional IC via the data line after a wait time after the data request command, to measure a duration of deactivation of the clock line by the additional IC after the read command, and to update the wait time between a next data request command and a subsequent data read command according to the measured duration.

According to some example implementations, the processor is configured to send the data read command to the additional IC after a specified minimum data provision time has elapsed since the data request command.

According to some example implementations, the processor is configured to maintain the updated wait time for a plurality of next data request commands and data read commands, and then to determine a renewed updated wait time.

According to some example implementations, the processor is configured to use the updated wait time for the next data request command and the next data read command, and then gradually reduce the wait time between data request command and data read command until a renewed deactivation of the clock line is detected by the additional IC.

According to some example implementations, the IC is configured as a microcontroller.

According to some example implementations, the data provision command includes a command to a sensor IC to measure sensor data.

BRIEF DESCRIPTION OF THE DRAWINGS

Some examples of devices and/or methods are explained in more detail below merely by way of example with reference to the accompanying figures, in which.

DETAILED DESCRIPTION

Some examples are now described in more detail with reference to the accompanying figures. However, further possible examples are not restricted to the features of these implementations that are described in detail. These may include modifications of the features, as well as equivalents and alternatives to the features. Furthermore, the terminology used herein to describe specific examples should not be restrictive for further possible examples.

The same or similar reference signs relate throughout the description of the figures to the same or similar elements or features, which may each be implemented identically or else in a modified form, while providing the same or a similar function. In the figures, the thicknesses of lines, layers and/or regions may also be exaggerated for clarification.

When two elements A and B are combined using an "or", this should be understood as meaning that all possible combinations are disclosed, e.g., only A, only B, and also A and B, unless expressly defined otherwise in the individual case. "At least one of A and B" or "A and/or B" may be used as alternative wording for the same combinations. This applies equivalently to combinations of more than two elements.

If a singular form, e.g., "a, an" and "the", is used, and the use of only a single element is neither explicitly nor implicitly defined as mandatory, other examples may also use multiple elements to implement the same function. When a function is described in the following as being implemented using multiple elements, further examples may implement the same function using a single element or a single processing entity. Furthermore, it goes without saying that the terms "comprises", "comprising", "has" and/or "having" when used describe the presence of the stated features, whole numbers, steps, operations, processes, elements, components and/or a group thereof, but do not thereby exclude the presence or the addition of one or more other features, whole numbers, steps, operations, processes, elements, components and/or a group thereof.

Figure 1A:
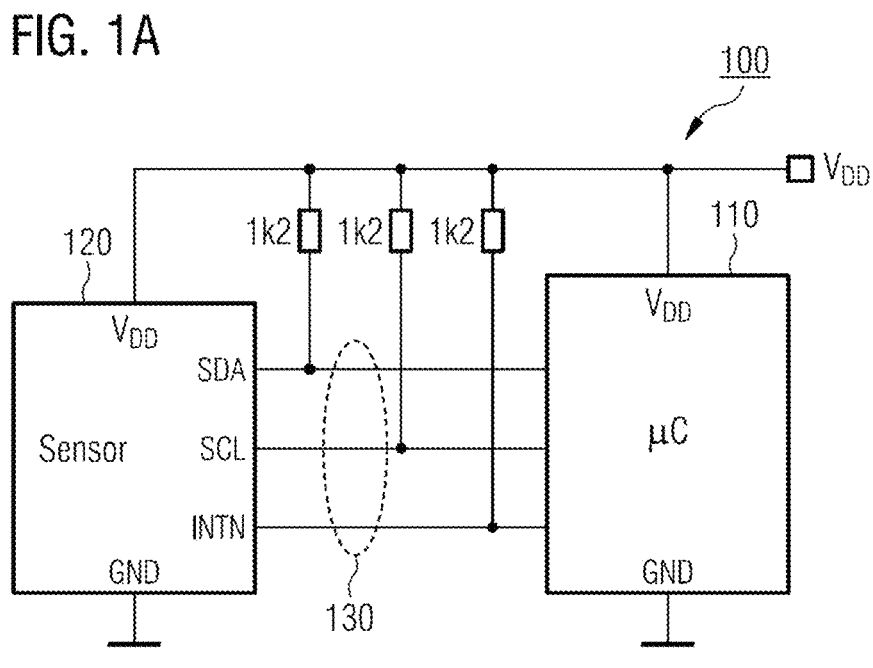
FIG. 1A shows an example of an electronic system having a master IC and a slave IC.

FIG. 1A shows an electronic system 100 with a master IC 110 and a slave IC 120. The master IC 110 is configured as a microcontroller (μC), the slave IC 120 is configured as a sensor IC in the example shown. Other implementations of the slave IC 120, e.g., as a display module, real-time clock (RTC), etc. are also possible.

Master IC 110 and slave IC 120 are connected to each other via a serial communication interface 130. The serial communication port 130 can be an I²C bus communication interface. The I²C bus communication interface 130 comprises a bidirectional data line (SDA) and a clock line (SCL) between the master IC 110 and the slave IC 120. In the example shown, there is also an interrupt line (INTN) between master IC 110 and slave IC 120.

The master IC or microcontroller 110 is an electronic component that acts as a host or master device in an I²C bus system. The microcontroller 110 controls and coordinates the communication between various I²C-capable components, which are referred to as slaves. The tasks of the microcontroller 110 in the I²C system can include, for example:

Initiating the communication: the microcontroller 110 starts communication by selecting the desired slave device, e.g., slave IC 120, on the I²C bus and starting communication.

Sending commands and data: the microcontroller 110 sends commands or data to the selected slaves, e.g., slave IC 120, in order to execute certain actions or to retrieve information.

Receiving data: the microcontroller 110 can receive data from the slaves, e.g., slave IC 120, in order to collect information or monitor the status of the slaves.

Handling errors and conflicts: the microcontroller 110 may be able to detect collisions or conflicts on the I²C bus and take appropriate measures to ensure that communication can continue.

Stopping communication: at the end of the communication, the microcontroller 110 can stop the transfer and release the I²C bus for other devices.

The microcontroller 110 can thus play a central role in the control and coordination of I²C communication in the electronic system 100 and enable the connection and interaction of various components, such as sensors, displays, memory chips and other peripherals.

Figure 1B:
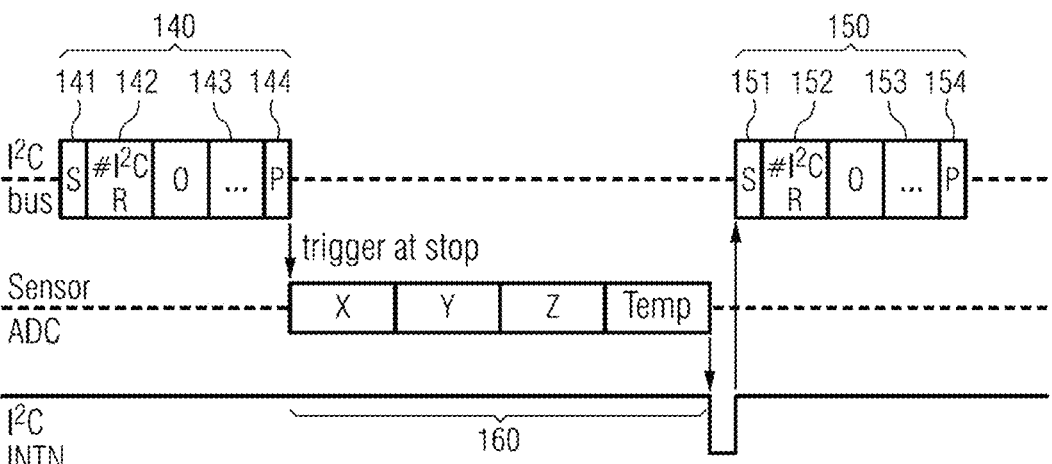
FIG. 1B shows an example of a data request command and a data read command.

The microcontroller 110 can start communication in the I²C protocol by generating a so-called "start condition" (S) 141 on the I²C bus. This is shown in FIG. 1B. The "start condition" (S) 141 can be part of a command 140, the first step to establish a connection to one or more I²C slave devices, e.g., slave IC 120. The start condition 141 can signal the start of a new transmission. The microcontroller 110 can start the communication as follows:

Send a start condition (Start Condition) 141: for example, the microcontroller 110 can pull the data line (SDA) from HIGH to LOW, while the clock line (SCL) remains at HIGH, for example. This creates a start condition that is detected by all I²C devices, e.g., slave IC 120, on the bus.

Address transmission 142: after generating the start condition, the microcontroller 110 can, for example, send a 7-bit address of the slave device, e.g., slave IC 120, with which it wants to communicate. The eighth bit of the address byte can indicate whether the microcontroller 110 wants to send data to the slave device 120 (0) or receive data 160 from the slave device 120 (1). In the latter case and in the event of non-existence of the data, the command 140 can be understood, for example, as a data request command to the slave device 120.

Waiting for confirmation (ACK/NACK): after sending the address 142, the microcontroller 110 can expect an acknowledgement (ACK, Acknowledge) from the slave IC 120. An ACK can be a short LOW level on the data line (SDA), which signals that the slave IC 120 can be reached. If the slave IC 120 is not reachable, it sends a NACK (Not Acknowledge) instead of the ACK, and the microcontroller 110 can take appropriate measures, e.g., to terminate the communication.

Continuing the communication: after the ACK is received, the microcontroller 110 can either send data 143 to the slave device 120 or receive data from the slave device 120, depending on the purpose of the communication.

Ending the communication: At the end of the communication, the microcontroller 110 can send a stop condition (Stop Condition) 144 by pulling the data line (SDA), for example, from LOW to HIGH, while the clock line remains at, for example, HIGH. This signals the end of the transmission.

An exact sequence of these steps may vary depending on the communication requirements. The microcontroller 110 can be responsible for controlling these steps and ensuring that the communication proceeds correctly and reliably.

In the example shown in FIG. 1B, the stop condition 144 of the data request command 140 triggers a measurement of the sensor IC 120. Thus, the stop condition (possibly together with the eighth bit of the address byte) can also be understood as a data request command to the sensor IC 120. Responding to the data request command 140, the sensor IC 120 can begin measuring the required data 160. This may include the collection of information such as temperature, pressure, humidity, luminous intensity or other physical parameters. For example, the sensor IC 120 can be configured as a 3D magnetic field sensor and measure x, y and z coordinates. Optionally, the sensor IC 120 can also have a temperature sensor and provide a temperature measurement value.

In the example shown in FIGS. 1A and 1B, an interrupt line (INTN) is provided between master IC 110 and slave IC 120, which can be pulled by the sensor IC 120, for example, from HIGH to LOW (or vice versa) as soon as the measured data 160 is available in the sensor IC 120. After signaling the interrupt by sensor IC 120, the sensor IC 120 can transmit the measured data at the request of the microcontroller 110. The data 160 can be sent back to the microcontroller 110 via the I²C bus.

The microcontroller 110 can read the data 160 from sensor IC 120 as follows:

after the interrupt, the microcontroller 110 can again send a start condition (Start Condition) 151 as part of a command 150. To do this the microcontroller 110 can pull the data line (SDA) from HIGH to LOW, for example, while the clock line (SCL) remains at HIGH, for example. This creates a start condition that is detected by all I²C devices, e.g., slave IC 120, on the bus.

Address transmission 152: after generating the start condition, the microcontroller 110 can send the 7-bit address of the slave device, e.g., slave IC 120, from which it wants to read the data. The eighth bit of the address byte indicates whether the microcontroller wants to receive data from the slave device (1). In the latter case and in the event of non-existence of the data 160, the command 150 can be understood, for example, as a data request command to the slave device 120.

Waiting for confirmation (ACK/NACK): After sending the address 152, the microcontroller 110 expects an acknowledgement (ACK) from the slave IC 120. An ACK is a short LOW level on the data line (SDA), which signals that the slave IC 120 can be reached. If the slave IC 120 is not reachable, it sends a NACK instead of the ACK, and the microcontroller 110 can take appropriate measures, e.g., terminate the communication.

Continuing the communication: After the ACK is received, the microcontroller 110 can receive data 160 from the slave device 120.

Ending the communication: At the end of the communication, the microcontroller 110 sends a stop condition 154 by pulling the data line (SDA), for example, from LOW to HIGH, while the clock line remains at, for example, HIGH. This signals the end of the transmission.

The stop condition 154, in the same way as the stop condition 144, can initiate or trigger the measurement of new sensor data 160, so that the stop conditions 144, 154 can also each be understood as a data request command and the eighth bit of the address byte 142, 152 as a data read command.

In the example described with reference to FIGS. 1A and 1B, due to the interrupt the data 160 can be read from the slave device 120 in a time-optimized manner as soon as it is available. This means a comparatively high communication bandwidth and low power consumption. However, the additional hardware outlay for the interrupt line (INTN) between master IC 110 and slave IC 120 is a disadvantage.

Figure 2A:
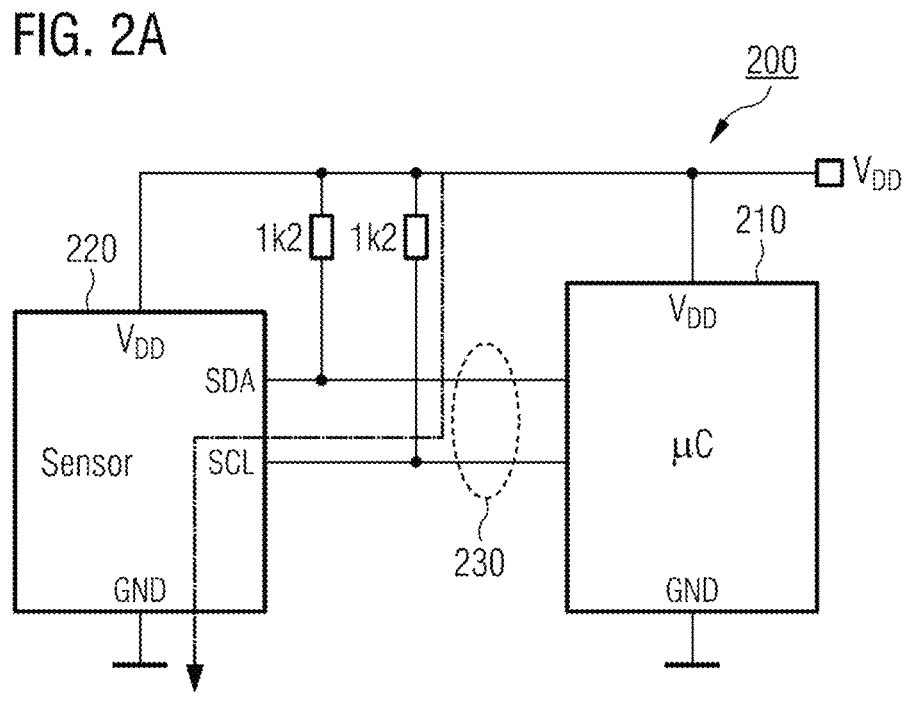
FIG. 2A shows a further example of an electronic system having a master IC and a slave IC.
Figure 2B:
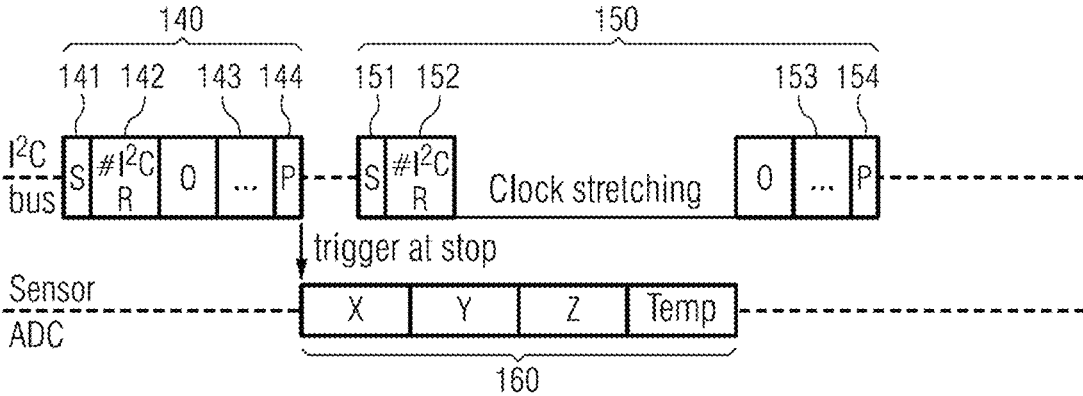
FIG. 2B shows a further example of a data request command and a data read command with clock stretching.

A possible implementation of the data exchange via the I²C bus 130 between master IC 110 and slave IC 120 without the interrupt line (INTN) is shown in FIGS. 2A and 2B. FIG. 2A shows an electronic system 200 with a master IC 110 and a slave IC 120. In contrast to the example of FIGS. 1A and 1B, there is no interrupt line here between master IC 110 and slave IC 120.

As in the example of FIGS. 1A and 1B, the master IC 110 is configured to send a data request command 140 or 144 to the slave IC 120 via the data line (SDA). The slave IC 120 is configured to begin the provision (measurement) of the requested data 160 in response to the data request command 140 or its stop condition 144. Immediately or directly after the data request command 140 or its stop condition 144, the slave IC 120 begins to provide or measure the requested data 160. In this example, the master IC 110 is configured to send the data read command 150 or 152 to the sensor IC 120 for reading out the requested data while the data 160 is still being measured (e.g., before it is available). The slave IC 120 is configured to deactivate the clock line (SCL) after receiving the eighth bit of the address byte (data read command) 152 until the slave IC 120 can provide the requested data 160. This concept is known as "clock stretching". The I²C communication protocol is a technique in which the slave device 120 can temporarily "stretch" the clock line (SCL) to slow down or stop transmission when it is not ready to forward data 160.

Clock stretching can work as follows:

Normal clock cycle: in the I²C protocol, there is the master IC 110, which controls the clock (SCL) and the data (SDA), as well as one or more slave ICs 120, which respond to requests from the master IC 110. The clock cycle is normally controlled by the master IC 110, and communication is synchronous with that clock.

Clock stretching cycle: if the slave IC 120 is not ready to send (or receive) data 160, it can temporarily "stretch" the clock cycle by, for example, pulling the clock line (SCL) to LOW. This signals to the master IC 110 that the slave IC 120 needs more time to prepare or process the data 160. The master IC 110 detects the clock stretching signal of the slave IC 120 and waits until the clock line (SCL) returns to HIGH. During the clock stretching, the master IC 110 remains inactive and gives the slave IC 120 the time required to complete its tasks. As soon as the slave IC 120 is ready, it resets the clock line (SCL) back to HIGH and communication can continue. The Master IC 110 continues the clock cycle and the data transfer can be carried out as usual.

Clock stretching is a feature in the I²C protocol because it allows the slave devices 120 to slow down or stop communication when they are unable to process data in real time. This is particularly useful in applications where the slave devices 120 may not be able to work as fast as the master 110, or if there are unforeseen delays. Clock stretching allows I²C communication to be more reliable and robust against delays.

In the example described with reference to FIGS. 2A and 2B, the data 160 can also be read from the slave device 120 as soon as it is available. This means a comparatively high communication bandwidth. However, a disadvantage of this is a high power consumption, since during the clock stretching current can flow from the supply VDD to ground through the clock line (SCL) pulled to LOW, in the manner shown in FIG. 2A. Parallel communication between master 110 and other slaves is also not possible.

Figure 3:
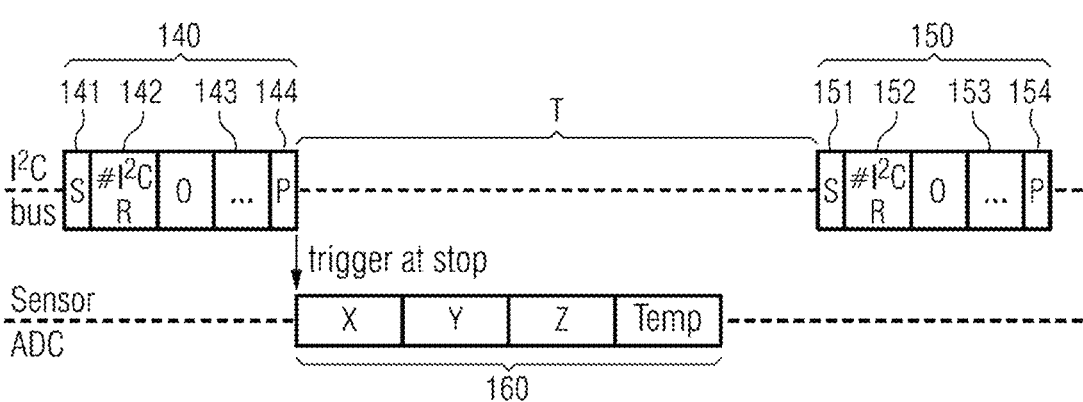
FIG. 3 shows a further example of a data request command and a data read command with a long wait time.

FIG. 3 shows a further communication option between master 110 and slave 120, in which neither the interrupt line (INTN) nor clock stretching is required.

As in previous examples, the master IC 110 here is configured to send a data request command 140, 144 to the slave IC 220 via the data line (SDA). The slave IC 220 is configured to begin the provision (measurement) of the requested data 160 immediately in response to the data request command 140, 144. In this example, however, the master IC 110 is configured to send the data read command 150, 152 for reading out the requested data to the sensor IC 220 after a longer, permanently defined wait time T. In this case, the wait time T between data request command 140 and data read command 150 can be selected to be long enough to outlast the data provision time (measurement time) and also to take into account possible oscillator variations on the clock line (SCL). This can lead to long wait times and thus to a comparatively low communication bandwidth.

In view of the disadvantages of the examples described above, the present disclosure proposes an electronic system 200 with master IC 110 and at least one slave IC 120. The electronic system 200 further comprises a serial communication interface 230 with a bidirectional data line (SDA) and a clock line (SCL). The communication interface 230 is configured to transfer data between the master IC 110 and the slave IC 120. The master IC 110 is configured to send a data request command 140, 144 to the slave IC 120 via the data line (SDA). The slave IC 120 is configured to start the provision (e.g., measurement) of requested data 160 in response to the data request command 140, 144. The master IC 110 is configured to send a data read command 150, 152 for reading the requested data 160 to the slave IC 120 via the data line (SDA) after the data request command 140, 144. The slave IC 120 is configured to deactivate the clock line (SCL) using clock stretching after receiving the data read command 150, 152 until the slave IC 120 can provide the requested data 160. According to proposed example implementations, the master IC 110 is configured to measure a duration of the deactivation of the clock line or a duration of the clock stretching. According to proposed example implementations, the master IC 110 is configured to set a wait time between at least one next data request command 154 and a next data read command according to the measured duration. This is shown in FIG. 4.

The proposed procedure thus corresponds to a combination of the approaches which have been described based on FIGS. 2B and 3.

The master IC 110 is configured to send the data request command 144 to the slave IC 120 via the data line (SDA). The slave IC 120 is configured to begin the provision (measurement) of the requested data 160 in response to the data request command 144. Immediately after the data request command 144, the slave IC 120 begins to provide or measure the data 160. The master IC 110 is configured to send the data read command 152 to read out the requested data to the sensor IC 120 while the measurement is still taking place, or immediately after the data request command 144. A time between the data request command 144 and data read command 152 is therefore less than an expected measurement duration. The slave IC 120 is configured to deactivate the clock line (SCL) after receiving the data read command 152 (clock stretching) until the slave IC 120 can provide the requested data 160 (after the measurement duration). The master IC 110 is configured to measure the duration of the clock stretching and to set the wait time between the next or subsequent data request command 144, 154 and a next data read command 142, 152 based on the measured duration of the clock stretching. Between subsequent data request commands 144, 154 and subsequent data read commands 142, 152, clock stretching is then no longer necessary, due to the suitable wait time that has been set.

Figure 4:
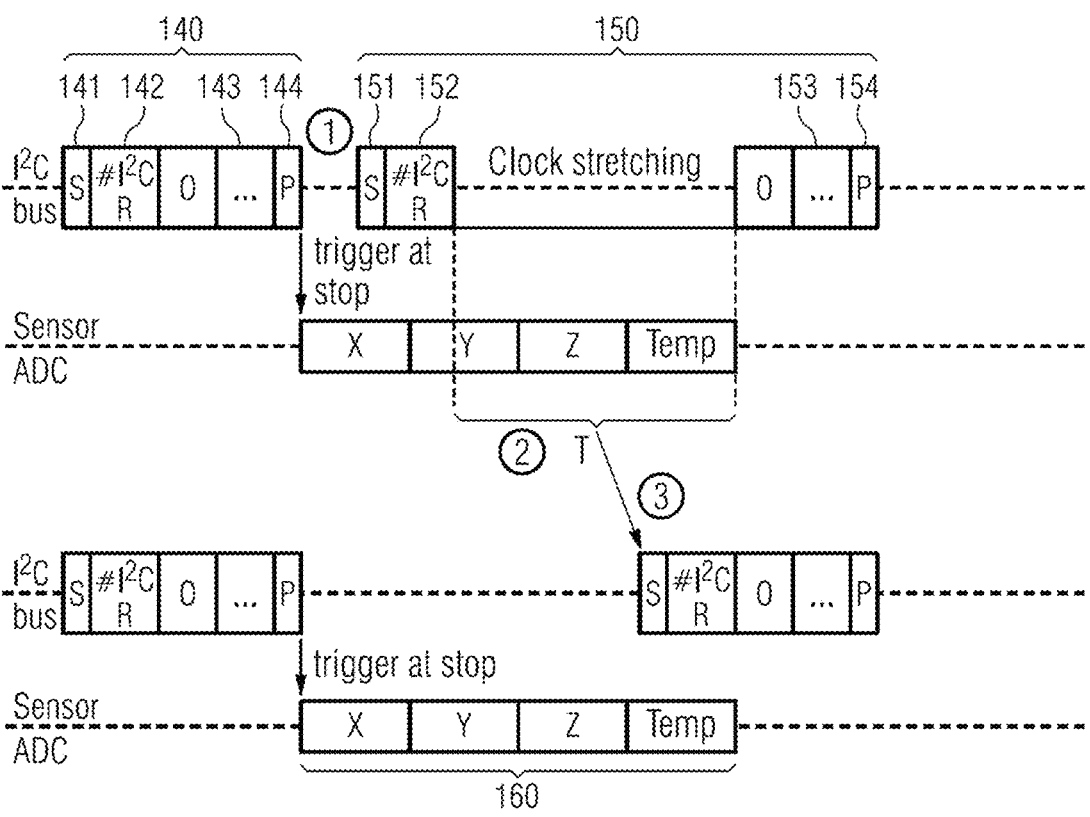
FIG. 4 shows an example implementation of a communication between the master IC and the slave IC.

The step marked with (1) in FIG. 4 relates to a data readout with clock stretching and immediate readout start after the data request command 144. At (2), the microcontroller 110 measures the clock stretching time and based on it, calculates the optimized readout start time (wait time) according to (3) after subsequent data request commands 144, 154. This can also lead to immediate readout of the data 160 when it is available. Furthermore, a lower power consumption of the system 200 than in FIG. 2B is possible. Low-cost I²C slaves 120 without an interrupt pin are possible. In addition, increased I²C bandwidth is possible.

Figure 5:
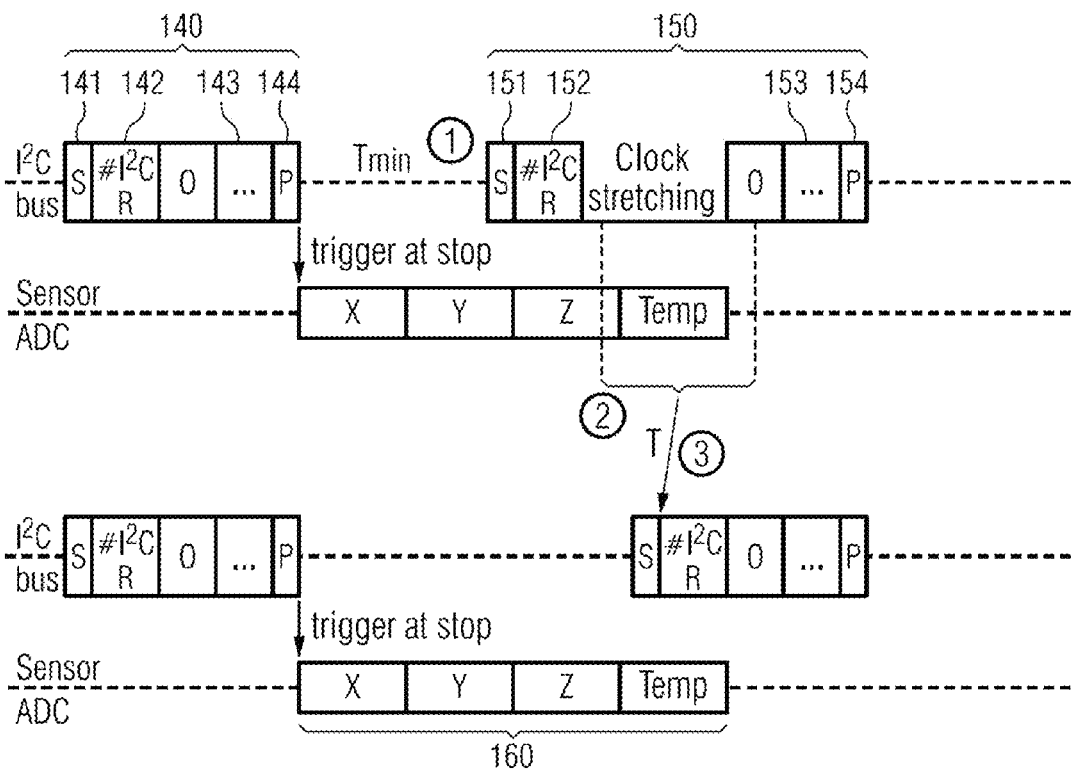
FIG. 5 shows a further example implementation of a communication between the master IC and the slave IC.

In the example implementation shown in FIG. 5, the master IC 110 is configured to send the data read command 150, 152 to the slave IC 120 after a minimum data provision time $T_{min}$ specified in a data sheet has elapsed since the data request command 144. The slave IC 120 is configured, if the requested data 160 is not yet completely available after the specified minimum data provision time $T_{min}$, to deactivate (clock stretching) the clock line (SCL) until the slave IC 120 can provide the requested data 160. The master IC 110 is configured to measure the duration T of the deactivation of the clock line (clock stretching time) and to set the wait time between the next data request command 144, 154 and the next data read command 142, 152 based on the minimum data provision time and the measured clock stretching time. Essentially, the wait time between the next data request command 144, 154 and the next data read command 142, 152 can correspond to the sum of the minimum data provision time and the measured clock stretching time.

In the example implementation shown in FIG. 5, the readout of the data 160 begins with clock stretching corresponding to the minimum measuring time $T_{min}$ specified in the data sheet (of the sensor IC 120). The microcontroller 110 measures the clock stretching time. The microcontroller 110 calculates the optimized readout start time based on this. This optimized readout start time can then be used, for example, for all subsequent measurements and communications.

Figure 6:
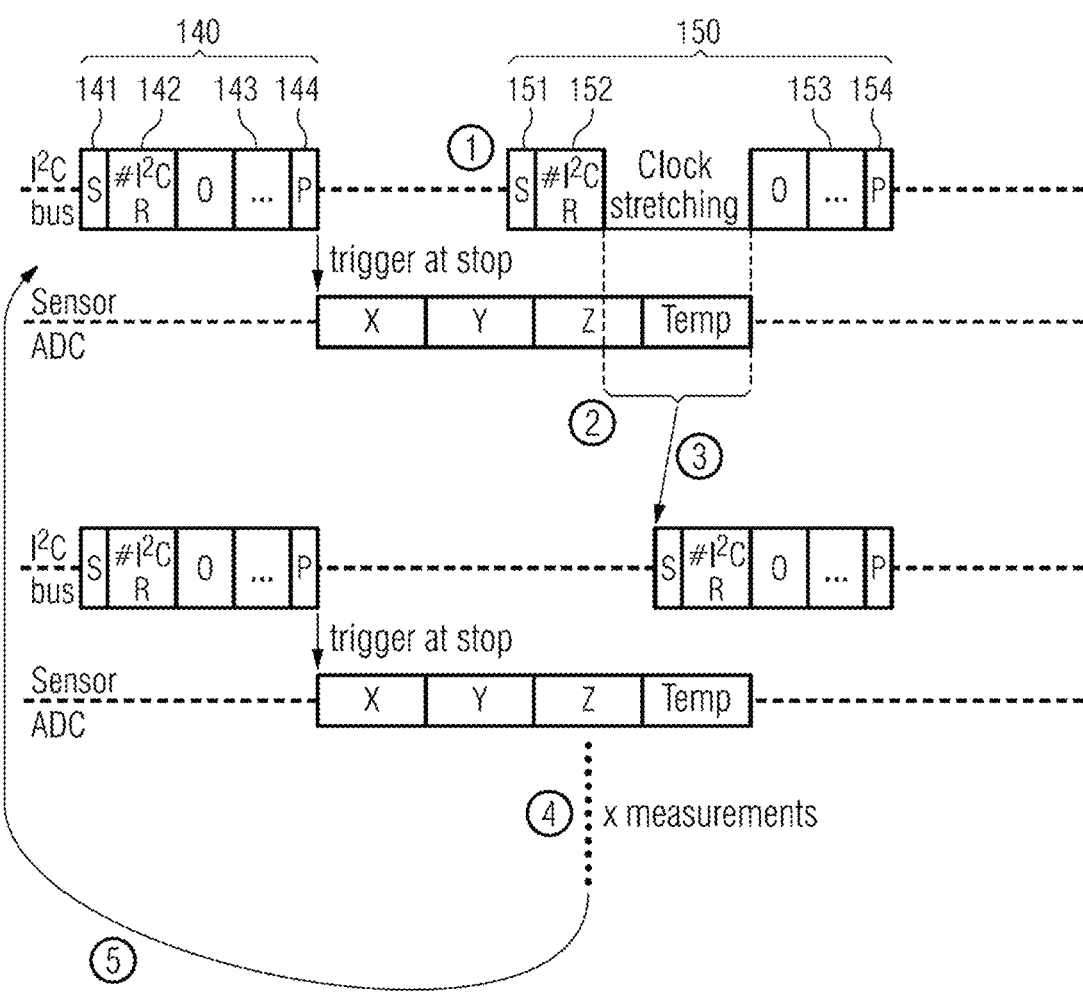
FIG. 6 shows a further example implementation of a communication between the master IC and the slave IC.

In the example implementation shown in FIG. 6, the master IC 110 is configured to maintain the wait time between data request command and data read command determined according to FIG. 4 or FIG. 5 for a plurality of next data request commands and next data read commands, and then to determine an updated wait time again according to FIG. 4 or FIG. 5.

The implementations according to FIG. 4 or FIG. 5 can thus be combined with the implementation according to FIG. 6. (1) The readout of the data 160 with clock stretching begins accordingly immediately or after the minimum measuring time specified in the data sheet. (2) The microcontroller 110 measures the clock stretching time. (3) The microcontroller 110 calculates the optimized readout start time. (4) Use of this optimized readout start time without clock stretching for a predetermined number x of measurements. (5) Then return to (1) to update the clock stretching time and repetition of steps (2) to (5).

Figure 7:
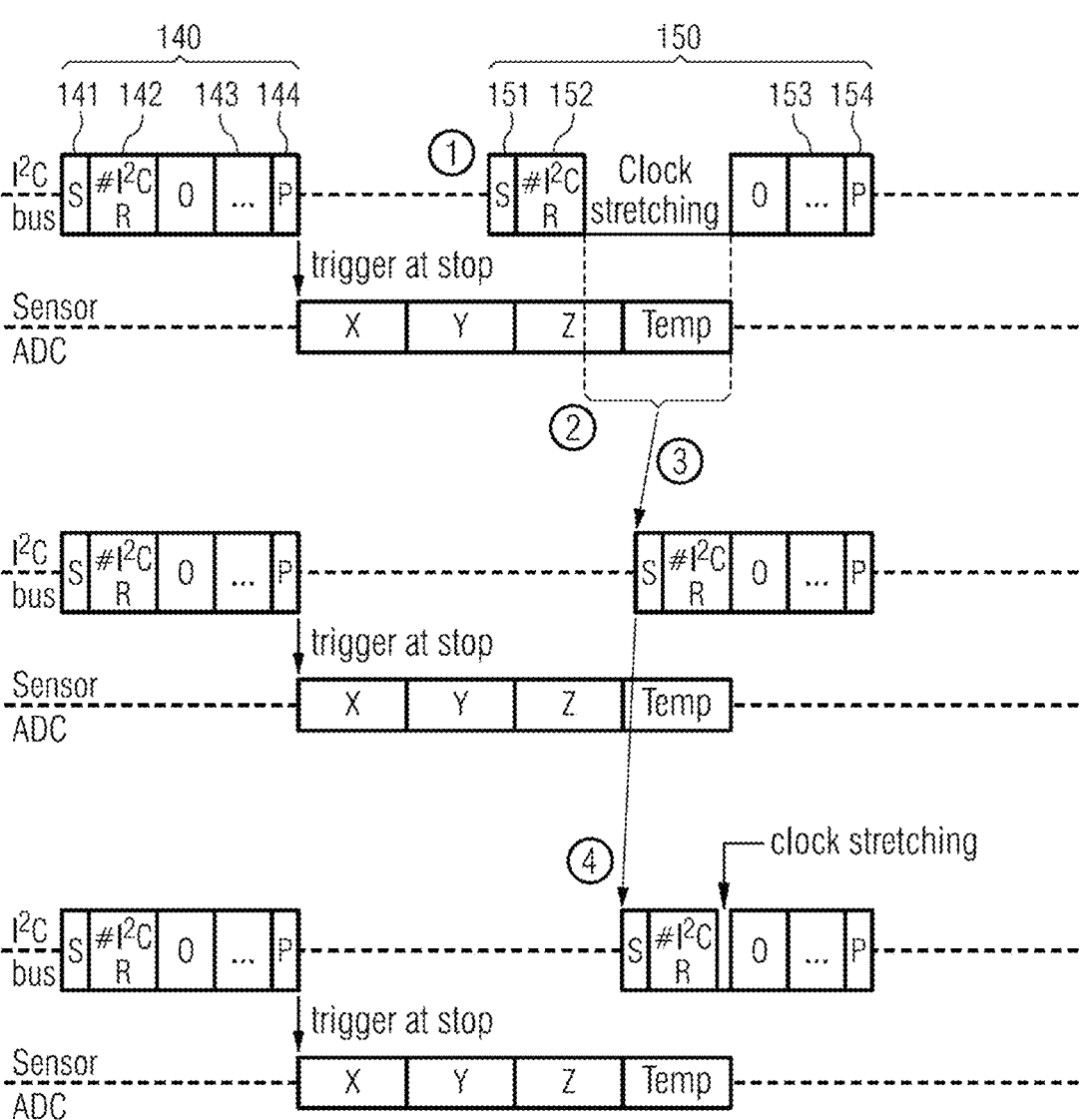
FIG. 7 shows a further example implementation of a communication between the master IC and the slave IC.

In the example implementation shown in FIG. 7, the master IC 110 is configured to use the wait time set according to one of the example implementations of FIGS. 4 to 6 for a data request command 144 and the subsequent data read command 150, 152 and then to reduce the wait time between further data request commands 144 and data read commands 150, 152 gradually until a renewed clock stretching is detected by the slave IC 120, in order to provide the requested data 160 on the data line (SDA). The master IC 110 is configured to measure the renewed clock stretching and to set a renewed updated wait time between the next data request command 144 and the subsequent data read command 150, 152 based on the measured updated clock stretching.

The implementations according to FIG. 4 to FIG. 6 can thus be combined with the implementation according to FIG. 7. (1) The readout of the data with clock stretching begins immediately or after the minimum measuring time specified in the data sheet. (2) The microcontroller 110 measures the clock stretching time. (3) The microcontroller 110 calculates the optimized readout start time and uses this optimized readout start time for a measurement. (4) The microcontroller 110 reduces the readout start time slightly for each subsequent measurement compared to the previous readout start time (wait time) until a clock stretching gap is detectable. Return to (2).

Figure 8:
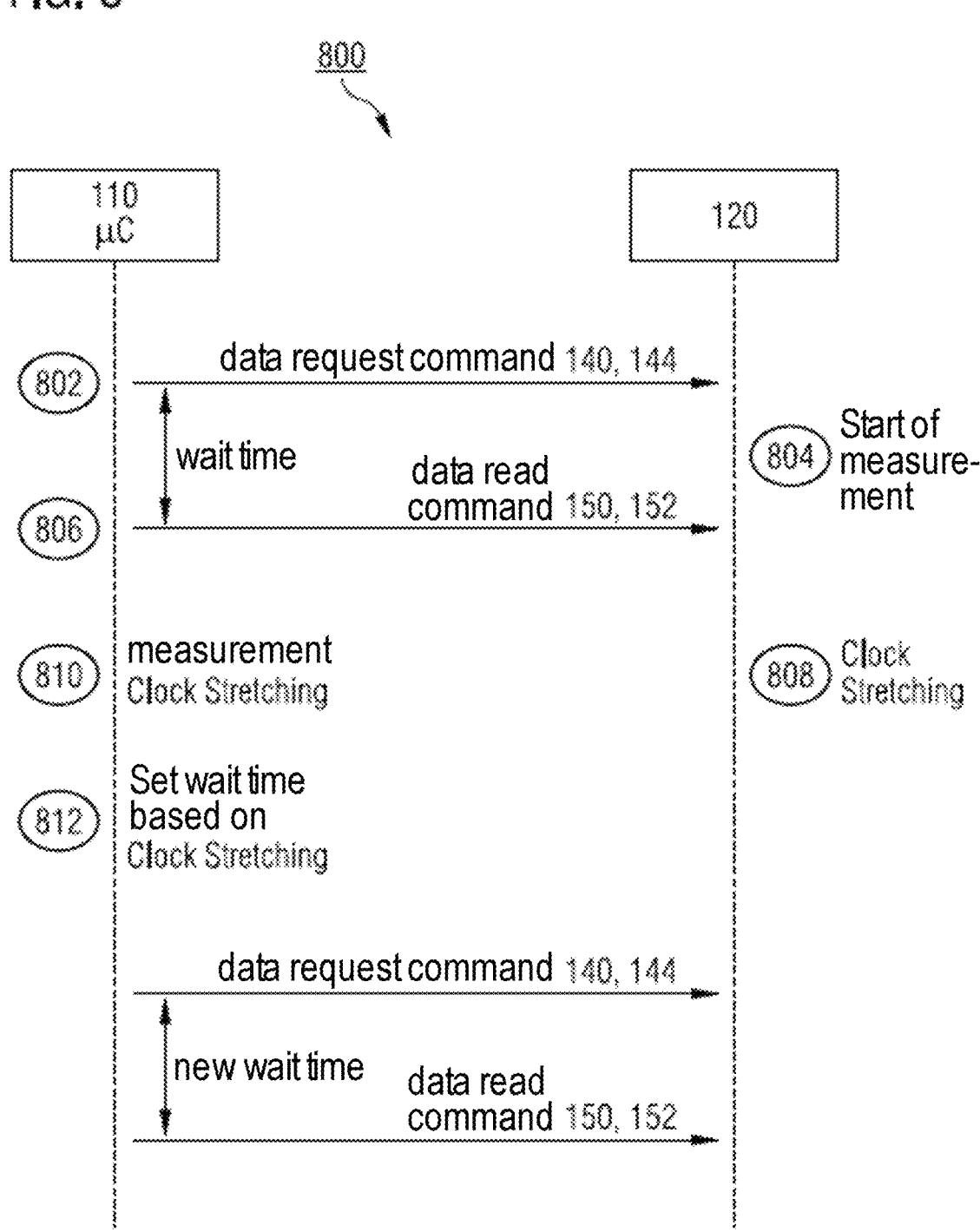
FIG. 8 shows a communication method between a master IC and a slave IC, according to an example implementation.

FIG. 8 summarizes a flow diagram of a communication method 800 between the master IC 110 and the slave IC 120.

At 802, the master IC 110 sends a data request command 140; 144 to the slave IC 120 via the data line (SDA). At 804, the slave IC 120, in response to the data request command 140; 144, begins providing requested data 160. At 806, the master IC 110 sends a data read command 150; 152 for reading out the requested data 160 to the slave IC 120 via the data line after the data request command 140; 144. In step 808, the slave IC 120 deactivates the clock line (SCL) after receiving the data read command 150; 152 until the slave IC 120 can provide the requested data 160. In step 810, the master IC 110 measures the duration of the deactivation of the clock line. In step 812, the master IC 110 sets a wait time between a next data request command 140; 144 and a next data read command 150; 152 based on the measured duration.

The aspects and features described in connection with a particular one of the previous examples may also be combined with one or more of the other examples to replace an identical or similar feature of this other example or to introduce the feature additionally into the other example.

Examples may also be or relate to a (computer) program with a program code for performing one or more of the above methods or refer to it when the program is running on a computer, processor, or other programmable hardware component. This means that steps, operations, or processes of various of the methods described above can also be performed by programmed computers, processors, or other programmable hardware components. Examples may also cover program memory devices, for example digital data storage media, which are machine-, processor- or computer-readable and which encode or contain machine-executable, processor-executable or computer-executable programs and instructions. The program memory devices may comprise or be for example digital memories, magnetic storage media, such as for example magnetic disks and magnetic tapes, hard disk drives or optically readable digital data storage media. Other examples may also cover computers, processors, control units, field-programmable logic arrays ((F)PLAs= (Field) Programmable Logic Arrays), field-programmable gate arrays ((F)PGA=(Field) Programmable Gate Arrays), graphics processors (GPU=Graphics Processor Unit), application-specific integrated circuits (ASIC=application-specific integrated circuit), integrated circuits (IC=Integrated Circuit), or one-chip systems (SoC=System-on-a-Chip) which are programmed to perform the steps in the methods described above.

It is also goes without saying that the disclosure of multiple steps, processes, operations or functions disclosed in the description or claims shall not be construed as mandatory in the sequence described, unless this is explicitly stated in the individual case or is mandatory for technical reasons. Therefore, the previous description does not restrict the execution of multiple steps or functions to a specific sequence. Furthermore, in other examples, a single step, a single function, a single process or a single operation may include and/or be broken into multiple substeps, functions, processes or operations.

If some aspects have been described in the preceding sections in connection with an apparatus or system, these aspects should also be understood as a description of the corresponding method. In this case, for example, a block, an apparatus or a functional aspect of the apparatus or the system may correspond to a feature, such as a method step, of the corresponding method. Correspondingly, aspects described in connection with a method should also be understood as a description of a corresponding block, a corresponding element, a property or a functional feature of a corresponding apparatus or of a corresponding system.

The following claims are hereby incorporated into the detailed description, each claim being independent as a separate example. It should also be noted that—although a dependent claim in the claims refers to a particular combination with one or more other claims—other examples may also comprise a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:
1. An electronic system, comprising:
a master integrated circuit (IC);
a slave IC; and
a serial communication interface having a bidirectional data line and a clock line,
wherein the serial communication interface is configured to transfer data between the master IC and the slave IC,
wherein the master IC is configured to send a data request command to the slave IC via the bidirectional data line,
wherein the slave IC is configured to begin providing requested data based on the data request command,
wherein the master IC is configured to send a data read command; for reading the requested data to the slave IC via the bidirectional data line, after sending the data request command,

wherein the slave IC is configured to deactivate the clock line after receiving the data read command until the slave IC can provide the requested data,
wherein the master IC is configured to measure a duration of a deactivation of the clock line, and
wherein the master IC is configured to set a wait time between a next data request command and a next data read command according to the measured duration.
2. The electronic system as claimed in claim 1, wherein the master IC is configured to send the data read command to the slave IC after a specified minimum data provision time has elapsed since a time at which the data request command is sent,
wherein the slave IC is configured, if the requested data is not yet completely available after the specified minimum data provision time, to deactivate the clock line until the slave IC can provide the requested data,
wherein the master IC is configured to measure the duration of the deactivation of the clock line, and
wherein the master IC is configured to set the wait time between the next data request command and the next data read command according to the minimum data provision time and the measured duration.
3. The electronic system as claimed in claim 1, wherein the master IC is configured to maintain the wait time for a plurality of subsequent data request commands and next data read commands, and then to determine an updated wait time.
4. The electronic system as claimed in claim 1, wherein the master IC is configured to use the wait time for a data request command and a subsequent data read command and then to reduce the wait time between the data request command and the data read command until a renewed deactivation of the clock line is detected by the slave IC, in order to be able to provide the requested data on the bidirectional data line.
5. The electronic system as claimed in claim 4, wherein the master IC is configured to measure a duration of the renewed deactivation of the clock line, and to set a re-updated wait time between the next data provision command and the subsequent data read command according to the measured duration.
6. The electronic system as claimed in claim 1, wherein the master IC comprises a microcontroller.
7. The electronic system as claimed in claim 1, wherein the slave IC comprises a sensor IC.
8. The electronic system as claimed in claim 1, wherein the slave IC comprises a magnetic field sensor IC.
9. The electronic system as claimed in claim 1, wherein the slave IC comprises a 3D Hall sensor IC.
10. The electronic system as claimed in claim 1, wherein the serial communication interface comprises an I²C communication interface.
11. An integrated circuit, IC, comprising:
a serial communication interface having a bidirectional data line and a clock line, wherein the communication interface is configured to transfer data between the IC and an additional IC via the bidirectional data line; and
a processor which is configured to;
send a data request command to the additional IC via the bidirectional data line,
send a data read command to the additional IC via the bidirectional data line after a wait time after a time at which the data request command is sent,
measure a duration of a deactivation of the clock line by the additional IC after a time at which the data read command is sent, and update the wait time between a next data request command and a subsequent data read command according to the measured duration.

12. The IC as claimed in claim 11, wherein the processor is configured to send the data read command to the additional IC after a specified minimum data provision time has elapsed since the time at which the data request command is sent.

13. The IC as claimed in claim 11, wherein the processor is configured to maintain the updated wait time for a plurality of following data request commands and data read commands, and then to determine a renewed updated wait time.

14. The IC as claimed in claim 11, wherein the processor is configured to;

use the updated wait time for the next data request command and the next data read command; and reduce the wait time between data request command and data read command until a renewed deactivation of the clock line is detected by the additional IC.

15. The IC as claimed in claim 11, wherein the IC is configured as a microcontroller.

16. The IC as claimed in claim 11, wherein the data request command comprises a command to a sensor IC for measuring sensor data.

17. A system comprising:

a master integrated circuit (IC) configured to:

send a data request command to a slave IC via a bidirectional data line to cause the slave IC to begin providing requested data;

send, after sending the data request command, a data read command for reading the requested data to the slave IC via the bidirectional data line;

measure a duration of a deactivation of a clock line, wherein the clock line is deactivated by the slave IC based on the slave IC receiving the data read command; and set a wait time between a next data request command and a next data read command according to the measured duration.

18. The system as claimed in claim 17, wherein the master IC is configured to send the data read command to the slave IC after a specified minimum data provision time has elapsed since a time at which the data request command is sent, and wherein the master IC is configured to set the wait time between the next data request command and the next data read command according to the specified minimum data provision time and the measured duration.

19. The system as claimed in claim 17, wherein the master IC is further configured to:

maintain the wait time for a plurality of subsequent data request commands and next data read commands; and determine an updated wait time based on maintaining the wait time for the plurality of subsequent data request command and next data read commands.

20. The system as claimed in claim 17, wherein the master IC is further configured to:

reduce the wait time between the data request command and the data read command until a renewed deactivation of the clock line is detected.

* * * * *